UNITED STATES PATENT OFFICE.

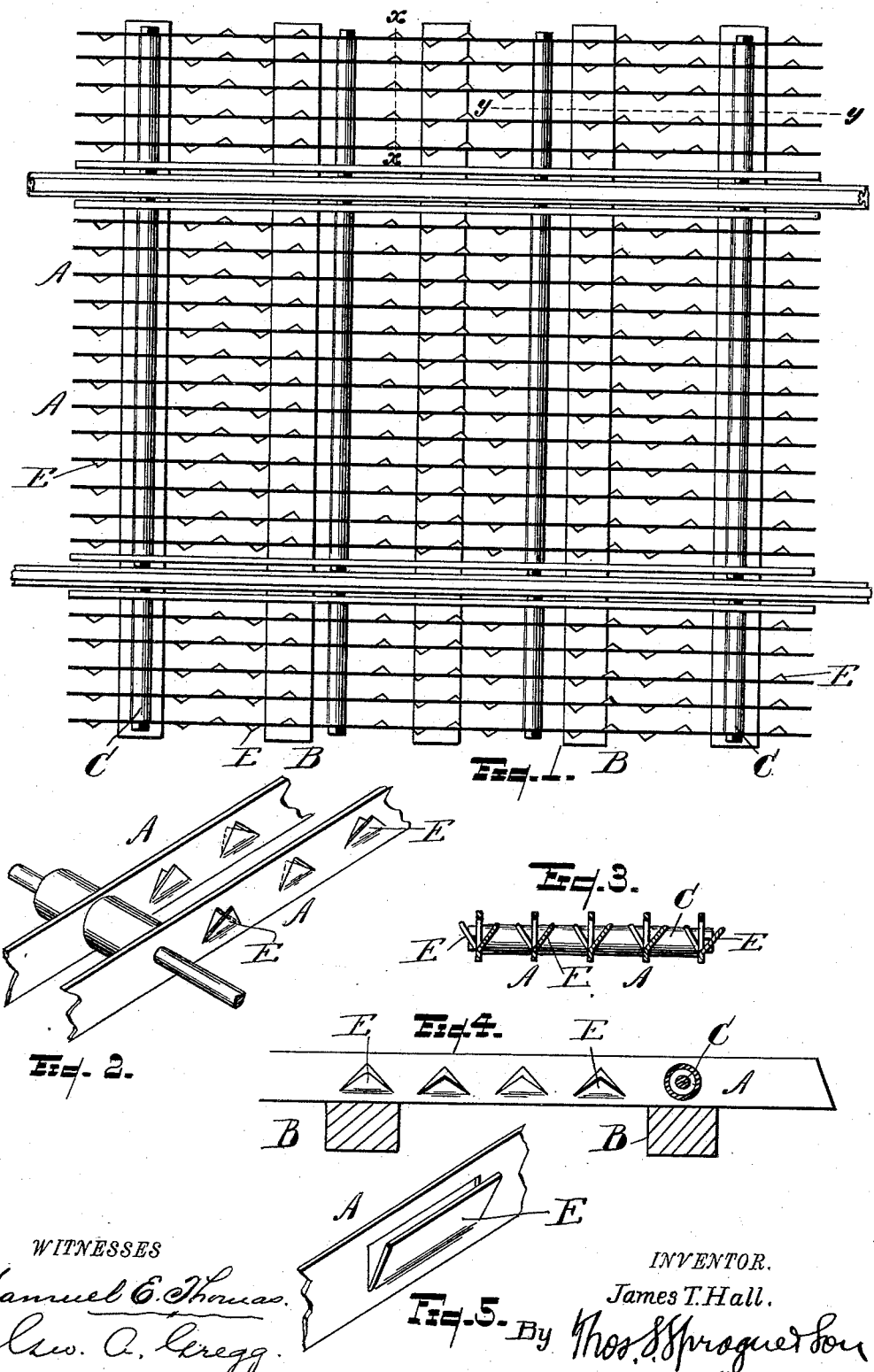

JAMES T. HALL, OF CHICAGO, ILLINOIS, ASSIGNOR TO THE NATIONAL SURFACE GUARD COMPANY, OF SAME PLACE.

SURFACE CATTLE-GUARD.

SPECIFICATION forming part of Letters Patent No. 418,013, dated December 24, 1889.

Application filed June 12, 1889. Serial No. 313,960. (No model.)

*To all whom it may concern:*

Be it known that I, JAMES T. HALL, a citizen of the United States, residing at Chicago, in the county of Cook and State of Illinois, have invented certain new and useful Improvements in Surface Cattle-Guards, of which the following is a specification, reference being had therein to the accompanying drawings.

This invention relates to new and useful improvements in surface cattle-guards; and the invention consists in the peculiar construction of the flexible bars of which the guard is composed, whereby it is made more effective in preventing the smaller animals—such as hogs and sheep—from walking upon the track, all as more fully hereinafter described and claimed.

In the drawings which accompany this specification, Figure 1 is a plan view of my improved cattle-guard. Fig. 2 is a perspective view of two bars thereof. Fig. 3 is a cross-section on line $x$ $x$ in Fig. 1. Fig. 4 is a cross-section on line $y$ $y$ in Fig. 1. Fig. 5 is a modification of the teeth.

The cattle-guard shown in the accompanying drawings is substantially the same as that shown in Patent No. 390,592, granted to me on October 2, 1888, but is designed to be an improvement thereon. This guard consists of the longitudinal bars or guard-rails A, supported upon the ties B and assembled into the form of gratings by means of the cross-bars C, on which are sleeved suitable thimbles, serving to hold the guard-rails the proper distance apart.

In the use of such cattle-guards it has been found that unless the bars were brought quite closely together, thereby to a certain extent overcoming the advantage of this class of guards, smaller animals—such as hogs, sheep, &c.—would cross the guards and pass upon the tracks. To overcome this objection and to make the security more perfect, I construct the guard-rails with a series of teeth E on each side. These teeth or points I preferably make by means of suitable dies which press outward an inverted-V-shaped section of the guard-rail upon each side thereof. In securing the guard-rails together into a grating I preferably arrange these teeth at equal distances between them, and with the teeth of one bar extending into the space between the two teeth of the other bar next adjoining, as shown in Fig. 1. By this construction I am enabled to get the full benefit of the flexible bars for the larger cattle without destroying the even upward presentation of the bars by notching or otherwise, which would give a hold to hanging chains or hooks on passing trains, and at the same time the teeth between the rails form so unpleasant and unreliable a footing for the smaller animals as to prevent their passage across the guard. By making the teeth in the shape of an inverted V it is impossible for a chain or hook to catch upon them. It is obvious that, if desired, the points may be secured to the sides of the guard by riveting or otherwise, instead of punching them out from the side of the guard itself, although I prefer the latter course on the ground of economy and simplicity. The result of such a construction is to present to the cattle the same form of footing as shown in my patent before referred to, and in addition thereto an upward presentation of points between the guard-rails.

In Fig. 5 is shown a modification in the shape of the teeth. When this construction is used, it practically consists of two series of surfaces having an upward presentation of edges, one series on a lower plane than the other, the lower one produced by pressing out sections of the body of the bars; but I still regard the projecting pieces as "teeth," no matter what the shape. It is evident that the teeth in each bar may all project in the same direction.

What I claim as my invention is—

1. A surface cattle-guard composed of guard-rails assembled together into gratings having supplementary teeth on the sides of the guard-rails, substantially as described.

2. A surface cattle-guard composed of a series of bars having sections pressed out to present a supplementary series of upwardly-projecting teeth, substantially as described.

3. A surface cattle-guard composed of a series of bars collected together into gratings having inverted-V-shaped sections pressed out of each bar alternately upon opposite sides to present a supplementary series of upwardly-projecting teeth, substantially as described.

In testimony whereof I affix my signature in presence of two witnesses

JAMES T. HALL.

Witnesses:
   B. M. DOOLITTLE,
   WILLARD F. CHANDLER.